(12) United States Patent
Kim et al.

(10) Patent No.: US 9,287,534 B2
(45) Date of Patent: Mar. 15, 2016

(54) RECHARGEABLE BATTERY

(71) Applicants: SAMSUNG SDI CO., LTD., Yongin-si, Gyeonggi-do (KR); ROBERT BOSCH GMBH, Stuttgart (DE)

(72) Inventors: Duk-Jung Kim, Yongin-si (KR); Byung-Kyu Ahn, Yongin-si (KR); Joong-Heon Kim, Yongin-si (KR); Zin Park, Yongin-si (KR)

(73) Assignees: SAMSUNG SDI CO., LTD., Yongin-si, Gyeonggi-do (KR); ROBERT BOSCH GmbH, Stuttgart (DE)

( * ) Notice: Subject to any disclaimer, the term of this patent is extended or adjusted under 35 U.S.C. 154(b) by 211 days.

(21) Appl. No.: 13/914,755

(22) Filed: Jun. 11, 2013

(65) Prior Publication Data

US 2014/0205895 A1   Jul. 24, 2014

(30) Foreign Application Priority Data

Jan. 21, 2013  (KR) .......................... 10-2013-0006657

(51) Int. Cl.
*H01M 2/04*   (2006.01)
*H01M 2/02*   (2006.01)

(52) U.S. Cl.
CPC .......... *H01M 2/0404* (2013.01); *H01M 2/0267* (2013.01); *H01M 2/0287* (2013.01); *H01M 2/0292* (2013.01); *H01M 2/043* (2013.01); *H01M 2/0491* (2013.01); *H01M 2/0473* (2013.01)

(58) Field of Classification Search
CPC . H01M 2/0277; H01M 2/028; H01M 2/0287; H01M 2/029; H01M 2/0292
See application file for complete search history.

(56) References Cited

U.S. PATENT DOCUMENTS

| | | | |
|---|---|---|---|
| 6,364,199 B1 * | 4/2002 | Rose .............................. | 229/101 |
| 6,461,757 B1 * | 10/2002 | Sasayama et al. .............. | 429/59 |
| 7,201,998 B2 | 4/2007 | Kim | |
| 2006/0238162 A1 * | 10/2006 | Cheon et al. ................... | 320/112 |
| 2007/0037046 A1 * | 2/2007 | Takahashi et al. .............. | 429/96 |
| 2010/0316892 A1 * | 12/2010 | Kim .................. | 429/7 |
| 2010/0316906 A1 * | 12/2010 | Nansaka et al. .............. | 429/181 |
| 2012/0052371 A1 * | 3/2012 | Kim et al. ...................... | 429/179 |
| 2013/0196210 A1 * | 8/2013 | Kim et al. ...................... | 429/153 |

FOREIGN PATENT DOCUMENTS

| | | |
|---|---|---|
| JP | 09-120806 A | 5/1997 |
| JP | 09-259843 A | 10/1997 |
| JP | 2007-200754 A | 8/2007 |
| JP | 2010-287408 A | 12/2010 |
| KR | 10-2004-0054128 A | 6/2004 |
| KR | 10-2008-0019311 A | 3/2008 |

* cited by examiner

*Primary Examiner* — Muhammad Siddiquee
(74) *Attorney, Agent, or Firm* — Lee & Morse, P.C.

(57) ABSTRACT

A rechargeable battery includes an electrode assembly including first electrodes and second electrodes, a casing including a space in which the electrode assembly is embedded, a cap plate combined with the casing, and a first thin film insulating member fused with the casing and surrounding the casing.

14 Claims, 10 Drawing Sheets

RECHARGEABLE BATTERY

CROSS-REFERENCE TO RELATED APPLICATION

Korean Patent Application No. 10-2013-0006657 filed on Jan. 21, 2013, in the Korean Intellectual Property Office, and entitled: "RECHARGEABLE BATTERY," is incorporated by reference herein in its entirety.

BACKGROUND

1. Field

Embodiments relate to a rechargeable battery.

2. Description of the Related Art

A rechargeable battery can be repeatedly charged and discharged, unlike a primary battery, which that cannot be repeatedly charged and discharged. A low-capacity rechargeable battery may be used in small and portable electronic devices, such as mobile phones, laptop computers, and camcorders. A high-capacity battery may be used as a power source for driving a motor in a hybrid vehicle.

A high-power rechargeable battery using non-aqueous electrolyte having a high energy density has been developed recently. The high-power rechargeable batteries are formed of a plurality of rechargeable batteries coupled in series so that the plurality of rechargeable batteries can be used to drive a motor in, for example, an electric vehicle requiring high power.

The high-capacity rechargeable battery may be formed of a plurality of rechargeable batteries coupled in series. Each rechargeable battery can have a cylindrical or angular shape.

SUMMARY

Embodiments are directed to a rechargeable battery including an electrode assembly including first electrodes and second electrodes, a casing including a space in which the electrode assembly is embedded, a cap plate combined with the casing, and a first thin film insulating member fused with the casing and surrounding the casing.

The first thin film insulating member may have a box shape having an open top.

The thin film insulating member may include a fusion part that is bent to cover the cap plate.

A terminal may be in the cap plate, the terminal being electrically connected to the electrode assembly and penetrating the cap plate. An upper insulating member may be under the terminal and may insulate the terminal and the cap plate from each other. A sealing part may be fused with the upper insulating member and surrounds a side of the upper insulating member at a top of the first thin film insulating member.

A thermal adhesion layer fused by heat or pressure and joined to the casing may be on a surface extending between the first thin film insulating member and the casing.

The thermal adhesion layer may be made of a hot-melt adhesive.

A thermal conductive adhesive layer may be between the first thin film insulating member and the casing.

A second thin film insulating member may be on the cap plate, the second thin film insulating member being fused with the first thin film insulating member and covering the cap plate.

A terminal may be in the cap plate, the terminal being electrically connected to the electrode assembly and penetrating the cap plate. A terminal hole through which the terminal passes may be in the second thin film insulating member.

The cap plate may include a vent member having notches therein. The second thin film insulating member may include a vent hole on the vent member such that the vent member is exposed through the vent hole.

The first thin film insulating member may be coated on the cap plate.

Each of the first thin film insulating member and the second thin film insulating member may have a tape shape including an adhesive layer.

A top of the first thin film insulating member may include a fusion part that is bent and fused with the second thin film insulating member.

A thermal adhesion layer fused by heat or pressure and joined to the cap plate may be on a surface extending between the second thin film insulating member and the cap plate.

A thermal conductive adhesive layer may be between the second thin film insulating member and the cap plate.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
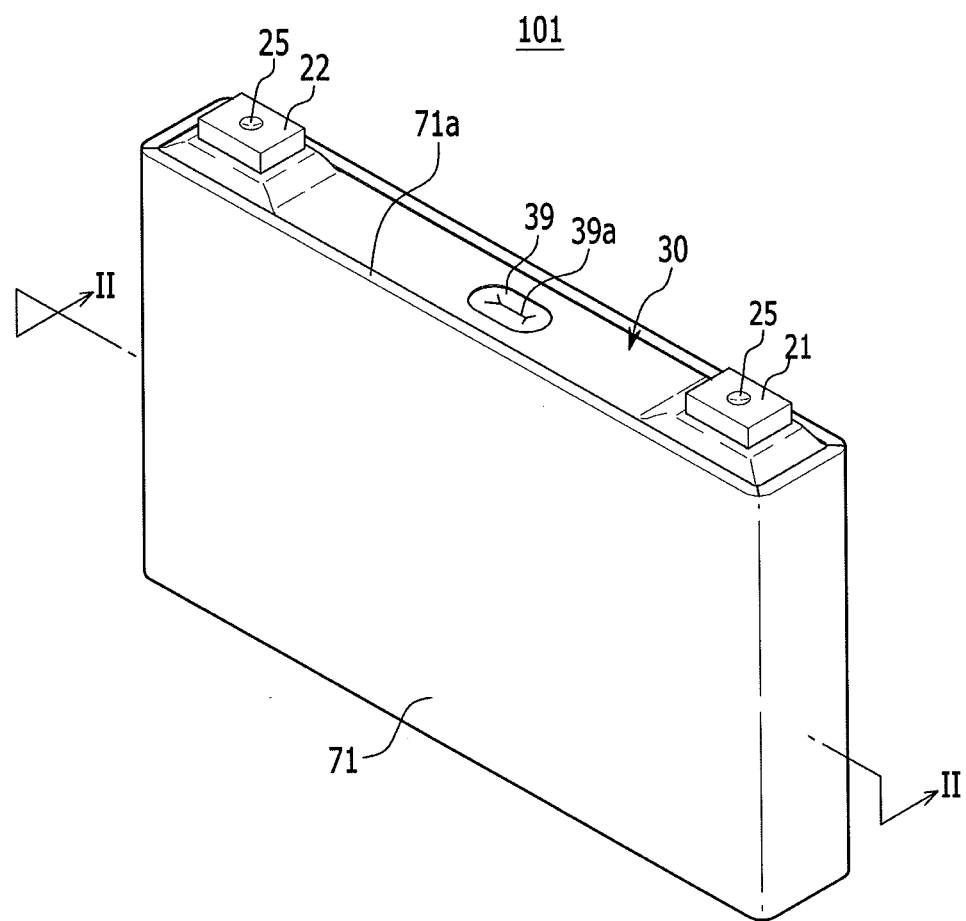
FIG. 1 illustrates a perspective view of a rechargeable battery in accordance with an exemplary embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of elements may be exaggerated for clarity of illustration. It will also be understood that when an element is referred to as being "on" another element, it can be directly on the other element, or elements may also be present. Further, it will be understood that when an element is referred to as being "between" two elements, it can be the only element between the two elements, or one or more intervening elements may also be present. Like reference numerals refer to like elements throughout.

Figure 2:
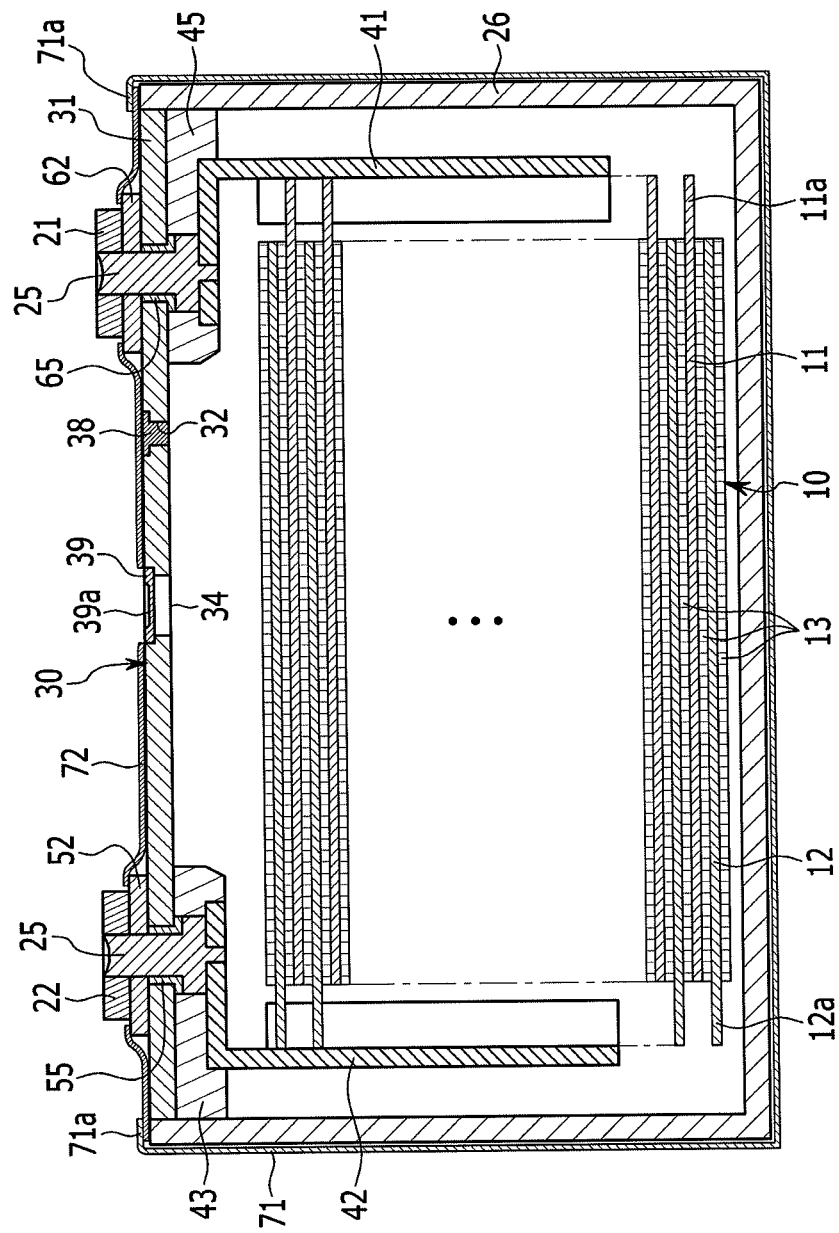
FIG. 2 illustrates a cross-sectional view of the rechargeable battery taken along line II-II of FIG. 1.

FIG. 1 illustrates a perspective view of a rechargeable battery in accordance with an exemplary embodiment, and FIG. 2 illustrates a cross-sectional view of the rechargeable battery taken along line II-II of FIG. 1.

Referring to FIGS. 1 and 2, the rechargeable battery 101 in accordance with the this exemplary embodiment may include an electrode assembly 10 spirally wound with a separator 13 interposed between a positive electrode 11 and a negative electrode 12, a casing 26 configured to have the electrode assembly 10 embedded therein, and a cap assembly 30 combined with the opening of the casing 26.

The rechargeable battery 101 in accordance with the first exemplary embodiment is illustrated as being a lithium ion rechargeable battery and as having an angular shape. In other implementations, the rechargeable battery 101 may be one of various types of batteries, such as a lithium polymer battery or a cylindrical battery.

The positive electrode 11 and the negative electrode 12 may include respective coating parts, that is, regions in each of which an active material is coated on a current collector made of thin metal foil, and respective positive electrode- and negative electrode-uncoated regions 11a and 12a on each of which an active material is not coated. The positive electrode-uncoated region 11a may be formed at the end of the positive electrode 11 on one side thereof in the length direction of the positive electrode 11, and the negative electrode-uncoated region 12a may be formed at the end of the negative electrode 12 on the other side thereof in the length direction of the negative electrode 12.

The positive electrode 11 and the negative electrode 12 are illustrated as being disposed with the separator 13, that is, an insulating member, interposed therebetween and then being spirally wound. In other implementations, the electrode assembly 10 may have a structure in which a positive electrode and a negative electrode each formed of a plurality of sheets are stacked with a separator interposed therebetween.

The casing 26 may have approximately a cuboid shape and may have an opening formed in one face thereof. The casing 26 may be made of aluminum or stainless steel.

The cap assembly 30 may include a cap plate 31 configured to cover the opening of the casing 26, a positive electrode terminal 21 externally protruded from the cap plate 31 and electrically connected to the positive electrode 11, and a negative terminal 22 externally protruded from the cap plate 31 and electrically connected to the negative electrode 12.

The cap plate 31 may be configured to have a sheet shape that is elongated in one direction. The cap plate 31 is combined with the opening of the casing 26. The cap plate 31 may include a sealing cap 38 formed in an electrolyte injection opening 32 and a vent member 39 installed in a vent hole 34 and configured to have a notch 39a formed therein such that the vent member 39 is opened at a predetermined pressure.

The positive electrode terminal 21 and the negative terminal 22 may be installed in such a way as to protrude upwardly from the cap plate 31. The positive electrode terminal 21 may be electrically connected to the positive electrode 11 through the medium of a current collection tab 41, and the negative terminal 22 may be electrically connected to the negative electrode 12 through the medium of a current collection tab 42.

A terminal connection member 25 may be installed between the positive electrode terminal 21 and the current collection tab 41 and configured to electrically couple the positive electrode terminal 21 and the current collection tab 41 together. The terminal connection member 25 may be inserted into a hole formed in the positive electrode terminal 21 and may be configured to have the top of the terminal connection member 25 welded and fixed to the positive electrode terminal 21 and the bottom of the terminal connection member 25 welded and fixed to the current collection tab 41.

A gasket 65 for sealing may be disposed between the terminal connection member 25 and the cap plate 31 and inserted into a hole through which the terminal connection member 25 passes. A lower insulating member 45 into which the lower part of the terminal connection member 25 is inserted may be installed under the cap plate 31.

A connection plate 62 for electrically coupling the positive electrode terminal 21 and the cap plate 31 together may be installed under the positive electrode terminal 21. The terminal connection member 25 may be inserted into the connection plate 62. Accordingly, the cap plate 31 and the casing 26 may be charged by the positive electrode 11.

The terminal connection member 25 for electrically coupling the negative terminal 22 and the current collection tab 42 together may be installed between the negative terminal 22 and the current collection tab 42. The terminal connection member 25 may be inserted into a hole formed in the negative terminal 22 and may be configured to have the top welded and fixed to the negative terminal 22 and the bottom welded and fixed to the current collection tab 42.

A gasket 55 for sealing may be disposed between the negative terminal 22 and the cap plate 31 and inserted into a hole through which the terminal connection member 25 passes. A lower insulating member 43 for insulating the negative terminal 22 and the current collection tab 42 from the cap plate 31 may be installed under the cap plate 31.

An upper insulating member 52 for electrically insulating the positive electrode terminal 21 and the cap plate 31 from each other may be installed under the negative terminal 22. The terminal connection member 25 may be inserted into the upper insulating member 52.

A first thin film insulating member 71 may be installed on the casing 26 and configured to surround the casing 26. A second thin film insulating member 72 may be installed on the cap plate 31 and configured to surround the cap plate 31.

Figure 3:
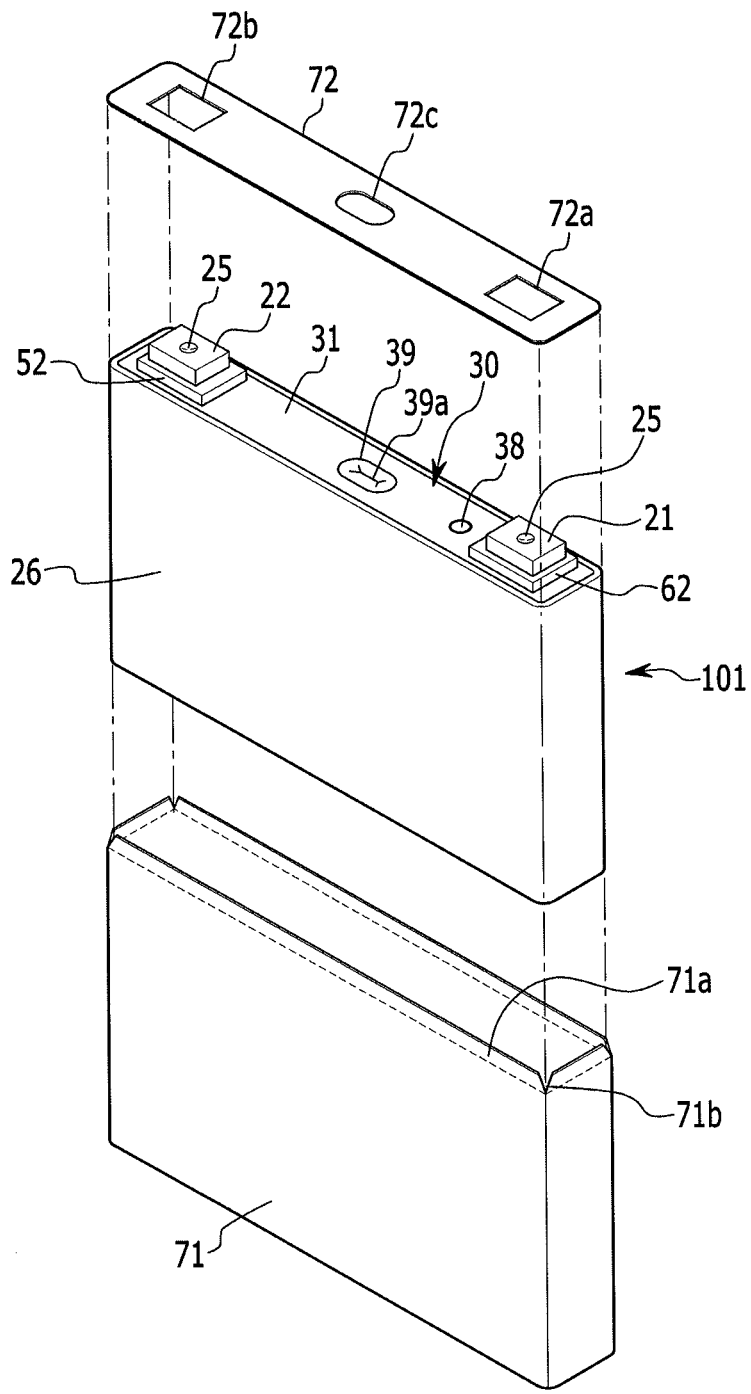
FIG. 3 illustrates an exploded perspective view of the rechargeable battery in accordance with the exemplary embodiment of FIG. 1.

As shown in FIG. 3, the first thin film insulating member 71 may be formed as a box shape having an internal space into which the casing 26 is inserted and may be configured to have an opening formed at the top. The first thin film insulating member 71 may be formed in a cuboid shape having the top opened, and a fusion part 71a may be formed at the top of the first thin film insulating member 71 and may be bent and fused with the second thin film insulating member 72. Incision parts 71b may be formed at edge parts of the fusion part 71a.

The second thin film insulating member 72 may be installed to cover the cap plate 31 and may be fused with the first thin film insulating member 71 and fixed thereto. A first terminal hole 72a configured to have the positive electrode terminal 21 pass therethrough, a second terminal hole 72b configured to have the negative terminal 22 pass therethrough, and a vent hole 72c formed over the vent member 39 and configured to have the vent member exposed therethrough may be formed in the second thin film insulating member 72.

Each of the first thin film insulating member 71 and the second thin film insulating member 72 may be formed in a film shape. In the state in which the second thin film insulating member 72 has been installed, the fusion part 71a covers a portion of the second thin film insulating member 72 and the fusion part 71*a* may be fixed to the second thin film insulating member 72 by thermal fusion.

The circumference of the first terminal hole 72*a* may be fused with and fixed to the connection plate 62, and the circumference of the second terminal hole 72*b* may be fused with and fixed to the upper insulating member 52. The circumference of the vent hole 72*c* may be fixed to the vent member 39 or the cap plate 31 by fusion.

When the first thin film insulating member 71 and the second thin film insulating member 72 are fused and fixed as in the present exemplary embodiment, a short due to condensation water in a dew condensation environment may be hindered or prevented, and the occurrence of corrosion may also be hindered or prevented. The infiltration of moisture into the surface layer of the casing 26 may be suppressed to a maximum extent to mitigate a corrosion condition.

Figure 4:
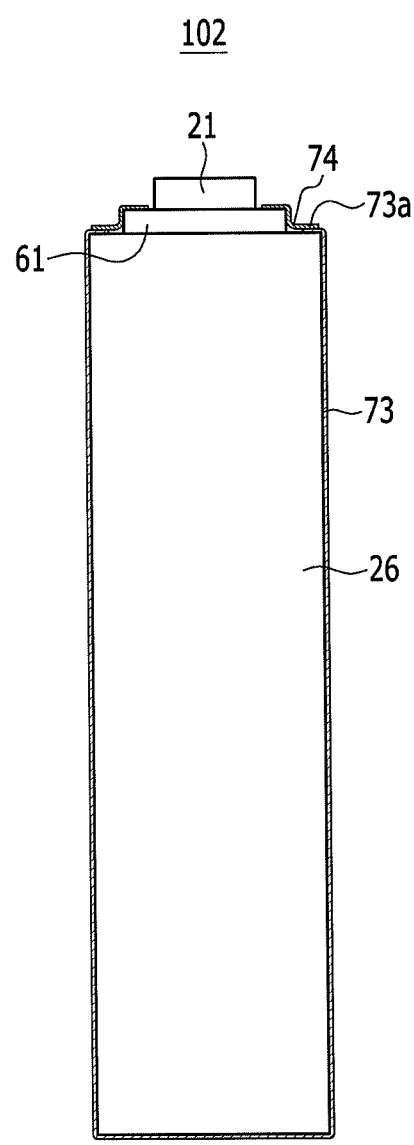
FIG. 4 illustrates a longitudinal cross-sectional view of a rechargeable battery in accordance with another exemplary embodiment.

FIG. 4 illustrates a longitudinal cross-sectional view of a rechargeable battery in accordance with another exemplary embodiment.

Referring to FIG. 4, the rechargeable battery 102 in accordance with the present exemplary embodiment may have the same structure as the rechargeable battery in accordance with the exemplary embodiment illustrated in FIGS. 1 through 3, except for the structure of a first thin film insulating member 73 and a second thin film insulating member 74. Thus, a redundant description of structures is not repeated.

The first thin film insulating member 73 may be installed on the casing 26 and configured to surround the casing 26, and the second thin film insulating member 74 may be installed on the cap plate 31 and configured to cover the cap plate 31.

The first thin film insulating member 73 may have a box shape having an internal space into which the casing 26 is inserted and may have an opening formed at the top. The first thin film insulating member 73 may have a cuboid shape having the top opened. A fusion part 73*a* may be formed at the top of the first thin film insulating member 73 and may be bent and fused with the second thin film insulating member 72.

The second thin film insulating member 74 may be installed in such a way as to cover the cap plate 31 and may be fused with and fixed to the first thin film insulating member 73.

Each of the first thin film insulating member 73 and the second thin film insulating member 74 may have a tape shape including an adhesive layer in a surface thereof coming into contact with the casing. In the state in which the first thin film insulating member 73 has been installed, the second thin film insulating member 74 may cover the fusion part 73*a* of the first thin film insulating member 73 and then may be fixed to the fusion part 73*a* by thermal fusion.

Figure 5:
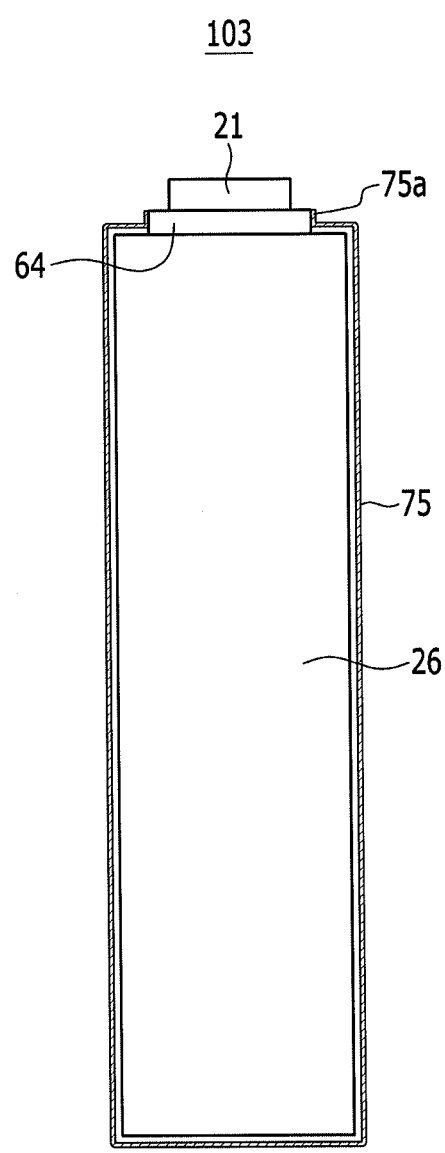
FIG. 5 illustrates a longitudinal cross-sectional view of a rechargeable battery in accordance with another exemplary embodiment.
Figure 6:
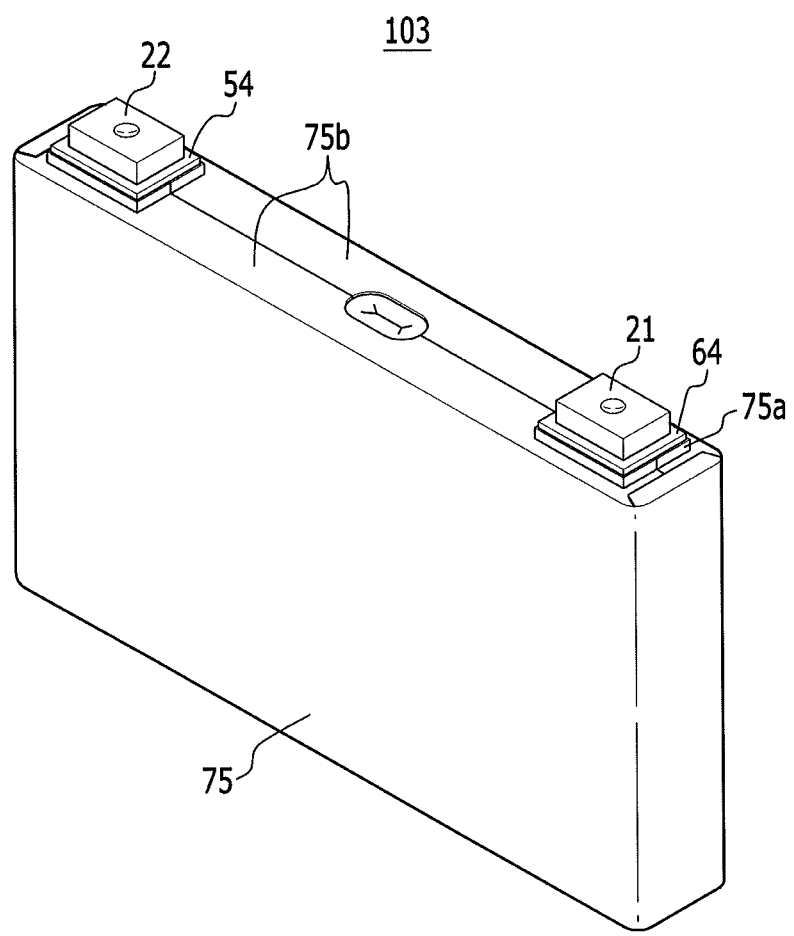
FIG. 6 illustrates a perspective view of the rechargeable battery in accordance with the exemplary embodiment of FIG. 5.

FIG. 5 illustrates a longitudinal cross-sectional view of a rechargeable battery in accordance with another exemplary embodiment, and FIG. 6 illustrates a perspective view of the rechargeable battery in accordance with this exemplary embodiment.

Referring to FIGS. 5 and 6, the rechargeable battery 103 in accordance with the present exemplary embodiment may have the same structure as the rechargeable battery in accordance with the exemplary embodiment illustrated in FIGS. 1-3, except for the structure of a first thin film insulating member 75. Thus, a redundant description of same structures is not repeated.

The first thin film insulating member 75 may be installed on the casing 26 and configured to surround the casing 26. The first thin film insulating member 75 may have a box shape having an internal space into which the casing 26 is inserted and may have an opening formed at the top thereof. A fusion part 75*b* may be formed at the top of the first thin film insulating member 75 and then bent and fused. The fusion part 75*b* may be bent to cover the cap plate. The fusion part 75*b* may include two sections, each section extending from a side of the first thin film insulating member, and the two sections may be joined together to surround the cap plate.

An upper insulating member 64 may be installed under the positive electrode terminal 21, and a sealing part 75*a* joined to an upper insulating member 54 may be installed under the negative terminal 22 at the top of the first thin film insulating member 75. The positive electrode terminal 21 and the negative terminal 22 in accordance with the present exemplary embodiment may be insulated from the cap plate 31. The upper insulating members 54 and 64 may be installed in order to insulate the cap plate 31 and the terminals 21 and 22 from each other. The sealing part 75*a* may be fused with the sides of the upper insulating members 54 and 64 and configured to surround the sides of the upper insulating members 54 and 64.

As described above, in accordance with the present exemplary embodiment, the first thin film insulating member 75 may be installed to cover the casing and the cap plate. Accordingly, a short due to condensation water in a dew condensation environment may be hindered or prevented, and the occurrence of corrosion may also be hindered or prevented. The infiltration of moisture into the surface layer of the casing 26 may be suppressed to a maximum extent to mitigate a corrosion condition.

Figure 7:
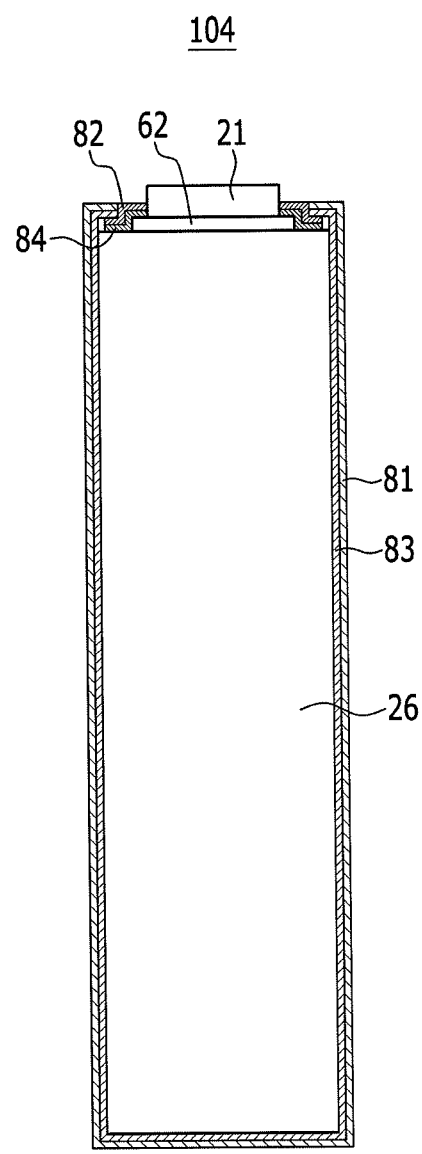
FIG. 7 illustrates a longitudinal cross-sectional view of a rechargeable battery in accordance with another exemplary embodiment.

FIG. 7 illustrates a longitudinal cross-sectional view of a rechargeable battery in accordance with another exemplary embodiment.

Referring to FIG. 7, the rechargeable battery 104 in accordance with the present exemplary embodiment may have the same structure as the rechargeable battery in accordance with the first exemplary embodiment except for the structure of a first thin film insulating member 81 and a second thin film insulating member 82. Thus, a redundant description of same structures is not repeated.

The first thin film insulating member 81 may be installed on the casing 26 and configured to surround the casing 26. The second thin film insulating member 82 may be installed on the cap plate 31 and configured to surround the cap plate 31.

The first thin film insulating member 81 may have a box shape having an internal space into which the casing 26 is inserted and may have an opening formed at the top thereof. The first thin film insulating member 81 may be configured to have a cuboid shape having the top opened and may be joined to the second thin film insulating member 82.

A first thermal adhesion layer 83 may be formed on a surface that extends between the first thin film insulating member 81 and the casing 26. The first thermal adhesion layer 83 may cover a same area of the casing 26 as the first thin film insulating member 81, between the first thin film insulating member 81 and the casing 26. The first thermal adhesion layer 83 may be fused and joined to the casing 26 and the second thin film insulating member 82. The first thermal adhesion layer 83 may be formed of a thermoplastic resin film.

The first thermal adhesion layer 83 may be made of a hot-melt adhesive including any one selected from the group of polyamide, polyurethane, ethylenevinyl acetate, and polyolefin. The first thermal adhesion layer 83 may be fused by surface pressure or heat and joined to the casing 26 and the second thin film insulating member 82.

The second thin film insulating member 82 may be configured to cover the cap plate 31 and may be fixed to the cap plate 31 and the first thin film insulating member 81. A second thermal adhesion layer 84 may be formed on a surface between the second thin film insulating member 82 and the cap plate 31. The second thermal adhesion layer 84 may cover a same area of the cap plate 31 as the second thin film insulating member 82, between the second thin film insulating member 82 and the cap plate. The second thermal adhesion layer 84 may be made of a thermoplastic resin film or a hot-melt adhesive.

In the state in which the second thin film insulating member 82 has been installed, the top of the first thin film insulating member 81 may be bent to cover the edges of the second thin film insulating member 82. The first thermal adhesion layer 83 may be adhered onto the second thin film insulating member 82.

If the first and second thermal adhesion layers 83 and 84 are formed on the insides of the first thin film insulating member 81 and the second thin film insulating member 82, respectively, as in the present exemplary embodiment, the first thin film insulating member 81 and the second thin film insulating member 82 may be closely joined to the casing and the cap plate, thus providing insulation. Accordingly, the infiltration of moisture may be hindered or prevented, and the occurrence of dew in the surface layer of the casing may also be hindered or prevented.

Figure 8:
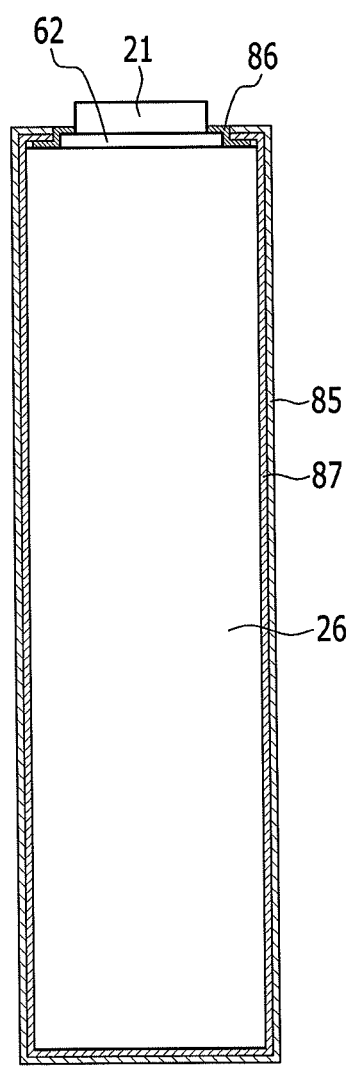
FIG. 8 illustrates a longitudinal cross-sectional view of a rechargeable battery in accordance with another exemplary embodiment.

FIG. 8 illustrates a longitudinal cross-sectional view of a rechargeable battery in accordance with another exemplary embodiment.

Referring to FIG. 8, the rechargeable battery 105 in accordance with the present exemplary embodiment may have the same structure as the rechargeable battery in accordance with the exemplary embodiment of FIGS. 1-3, except for the structure of a first thin film insulating member 85 and a second thin film insulating member 86. Thus, a redundant description of same structures will not be repeated.

The first thin film insulating member 85 may be installed on the casing 26 and configured to surround the casing 26. The second thin film insulating member 86 may be installed on the cap plate 31 and configured to surround the cap plate 31.

The first thin film insulating member 85 may have a box shape having an internal space into which the casing 26 is inserted and may have an opening formed at the top thereof. The first thin film insulating member 85 may be configured to have a cuboid shape having the top opened and may be joined to the second thin film insulating member 86.

A thermal adhesion layer 87 may be formed on a surface between the first thin film insulating member 85 and the casing 26. The thermal adhesion layer 87 may cover a same area of the casing 26 as the first thin film insulating member 85, between the first thin film insulating member 85 and the casing 26. The thermal adhesion layer 87 may be fused and joined to the casing 26 and the second thin film insulating member 86. The thermal adhesion layer 83 may be made of a thermoplastic resin film or a hot-melt adhesive. The thermal adhesion layer 83 may be fused by surface pressure or heat and joined to the casing 26 and the second thin film insulating member 82.

The second thin film insulating member 86 may be made of an insulating material coated to cover the cap plate 31 and may be formed on the cap plate 31. The second thin film insulating member 86 may be made of polymer and thinly coated on the cap plate 31.

In the state in which the second thin film insulating member 82 has been installed, the top of the first thin film insulating member 81 may be bent to cover the edges of the second thin film insulating member 82. The thermal adhesion layer 83 may be joined onto the second thin film insulating member 82.

Figure 9:
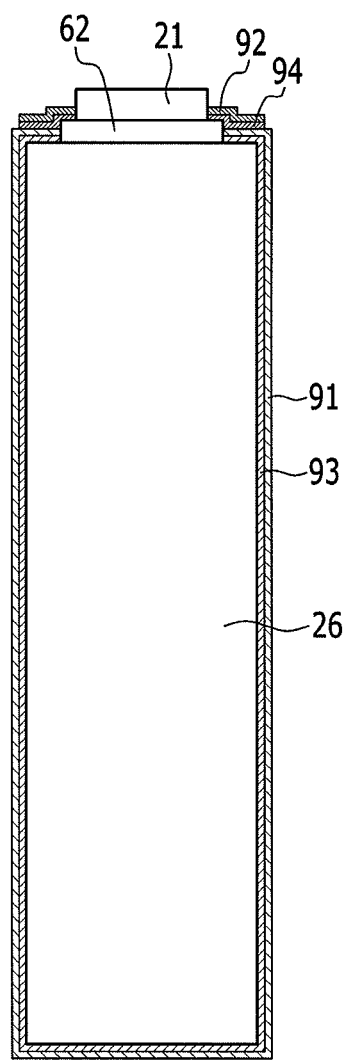
FIG. 9 illustrates a longitudinal cross-sectional view of a rechargeable battery in accordance with another exemplary embodiment.

FIG. 9 illustrates a longitudinal cross-sectional view of a rechargeable battery in accordance with another exemplary embodiment.

Referring to FIG. 9, the rechargeable battery 106 in accordance with the present exemplary embodiment may have the same structure as the rechargeable battery in accordance with the exemplary embodiment of FIGS. 1-3 except for the structure of a first thin film insulating member 91 and a second thin film insulating member 92. Thus, a redundant description of same structures is not repeated.

The first thin film insulating member 91 may be installed on the casing 26 and configured to surround the casing 26, and the second thin film insulating member 92 may be installed on the cap plate 31 and configured to surround the cap plate 31.

The first thin film insulating member 91 may have a box shape having an internal space into which the casing 26 is inserted and may have an opening formed at the top thereof. The first thin film insulating member 91 may be configured to have a cuboid shape having the top opened and may be joined to the second thin film insulating member 92.

A first thermal adhesion layer 93 may be formed on a surface that extends between the first thin film insulating member 91 and the casing 26. The first thermal adhesion layer 93 may cover a same area of the casing 26 as the first thin film insulating member 91, between the first thin film insulating member 91 and the casing 26. The first thermal adhesion layer 93 may be fused and joined to the casing 26 and the cap plate 31. The first thermal adhesion layer 93 may be made of a thermoplastic resin film or a hot-melt adhesive. The first thermal adhesion layer 93 may be fused by surface pressure or heat and joined to the casing 26 and the cap plate 31.

The second thin film insulating member 92 may be configured to cover the cap plate 31 and may be fixed to the cap plate 31 and the first thin film insulating member 91. A second thermal adhesion layer 94 may be formed on a surface that extends between the second thin film insulating member 92 and the cap plate 31. The second thermal adhesion layer 94 may cover a same area of the cap plate as the second thin film insulating member 92, between the second thin film insulating member 92 and the cap plate 31. The second thermal adhesion layer 94 may be made of a thermoplastic resin film or a hot-melt adhesive.

The top of the first thin film insulating member 91 into which the casing has been inserted may be bent and joined to the cap plate, and the second thin film insulating member 92 may be joined to the first thin film insulating member 91 and the cap plate 31.

Figure 10:
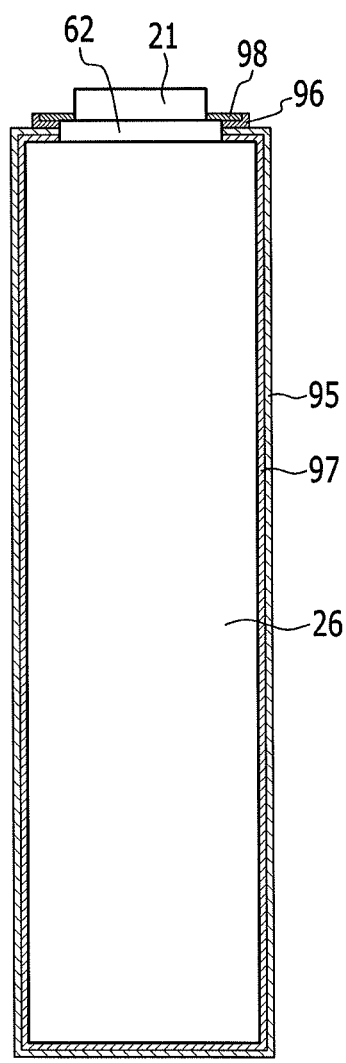
FIG. 10 illustrates a longitudinal cross-sectional view of a rechargeable battery in accordance with another exemplary embodiment.

FIG. 10 illustrates a longitudinal cross-sectional view of a rechargeable battery in accordance with another exemplary embodiment.

Referring to FIG. 10, the rechargeable battery 107 in accordance with the present exemplary embodiment may have the same structure as the rechargeable battery in accordance with the exemplary embodiment of FIGS. 1-3, except for a structure of a first thin film insulating member 95 and a second thin film insulating member 98. Thus, a redundant description of same structures is not repeated.

The first thin film insulating member 95 may be installed on the casing 26 and configured to surround the casing 26, and the second thin film insulating member 98 may be installed on the cap plate 31 and configured to cover the cap plate 31.

The first thin film insulating member 95 may have a box shape having an internal space into which the casing 26 is inserted and may have an opening formed at the top thereof. The first thin film insulating member 95 may have a cuboid shape having the top opened.

A first thermal conductive adhesive layer 97 may be formed on a surface between the first thin film insulating member 95 and the casing 26. The first thermal conductive adhesive layer 97 may cover a same area of the casing 26 as the first thin film insulating member 95, between the first thin film insulating member 95 and the casing 26. The first thermal conductive adhesive layer 97 may be made of epoxy, silicon, or acryl including metal particles, such as silver (Ag) or aluminum (Al).

The second thin film insulating member 98 may be configured to cover the cap plate 31 and may be fixed to the cap plate 31 and the first thin film insulating member 95. A second thermal conductive adhesive layer 96 may be formed on a surface that extends between the second thin film insulating member 98 and the cap plate 31. The second thermal conductive adhesive layer 96 may be made of epoxy, silicon, or acryl including metal particles, such as silver (Ag) or aluminum (Al).

The top of the first thin film insulating member 95 into which the casing has been inserted may be bent and joined to the cap plate 31, and the second thin film insulating member 98 may be joined to the first thin film insulating member 95 and the cap plate 31.

If the first and second thermal conductive adhesive layers 96 and 97 are formed on the insides of the first thin film insulating member and the second thin film insulating members 98 and 95, respectively, as in the present exemplary embodiment, heat generated from the casing may be easily discharged externally.

By way of summation and review, with a battery casing made of metal, such as aluminum, there is a danger of a short if moisture condenses outside the battery.

In contrast, embodiments provide a rechargeable battery having an advantage of improved safety. A short of the casing may be hindered or prevented by providing the thin film insulating member outside the casing.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope thereof as set forth in the following claims.

What is claimed is:

1. A rechargeable battery, comprising: an electrode assembly including first electrodes and second electrodes; a casing including a space in which the electrode assembly is embedded; a cap plate combined with the casing; and
    a first thin film insulating member fused with the casing and surrounding the casing,
    wherein a second thin film insulating member is coated on and covers the cap plate, wherein a top of the first thin film insulating member includes a fusion part that is bent and fused with the second thin film insulating member.

2. The rechargeable battery as claimed in claim 1, wherein the first thin film insulating member has a box shape having an open top.

3. The rechargeable battery as claimed in claim 2, wherein the thin film insulating member includes a fusion part that is bent to cover the cap plate.

4. The rechargeable battery as claimed in claim 2, wherein:
    a terminal is in the cap plate, the terminal being electrically connected to the electrode assembly and penetrating the cap plate,
    an upper insulating member is under the terminal and insulates the terminal and the cap plate from each other, and
    a sealing part is fused with the upper insulating member and surrounds a side of the upper insulating member at a top of the first thin film insulating member.

5. The rechargeable battery as claimed in claim 2, wherein a thermal adhesion layer fused by heat or pressure and joined to the casing is on a surface extending between the first thin film insulating member and the casing.

6. The rechargeable battery as claimed in claim 5, wherein the thermal adhesion layer is made of a hot-melt adhesive.

7. The rechargeable battery as claimed in claim 1, wherein a thermal conductive adhesive layer is between the first thin film insulating member and the casing.

8. The rechargeable battery as claimed in claim 1, wherein:
    a terminal is in the cap plate, the terminal being electrically connected to the electrode assembly and penetrating the cap plate, and
    a terminal hole through which the terminal passes is in the second thin film insulating member.

9. The rechargeable battery as claimed in claim 1, wherein:
    the cap plate includes a vent member having notches therein, and
    the second thin film insulating member includes a vent hole on the vent member such that the vent member is exposed through the vent hole.

10. The rechargeable battery as claimed in claim 1, wherein the first thin film insulating member has a tape shape including an adhesive layer.

11. The rechargeable battery as claimed in claim 1, further comprising a thermal layer covering five outer surfaces of the casing in their entirety, the first thin film insulating member being fused with the five outer surfaces of the casing in their entirety via the thermal layer.

12. The rechargeable battery as claimed in claim 11, wherein the thermal layer is a thermal adhesive layer.

13. A rechargeable battery, comprising: an electrode assembly including first electrodes and second electrodes; a casing including a space in which the electrode assembly is embedded; a cap plate combined with the casing; a first thin film insulating member fused with the casing and surrounding the casing, the first thin film insulating member including:
    a box-shaped part having an open top, the box-shaped part overlapping five surfaces of the casing,
    a bent fusion part extending from an upper edge of the box-shaped part toward the cap plate, the bent fusion part overlapping a portion of the cap plate; and
    a second thin film insulating member coated on the cap plate, the second thin film insulating member overlapping the bent fusion part and being fused with the bent fusion part.

14. The rechargeable battery as claimed in claim 13, wherein the bent fusion part includes four linear portions separated by incision parts, the four linear portions contact edges of each other via the incision parts to define a continuous frame when bent over the cap plate to be parallel therewith.

* * * * *